United States Patent Office 3,752,748
Patented Aug. 14, 1973

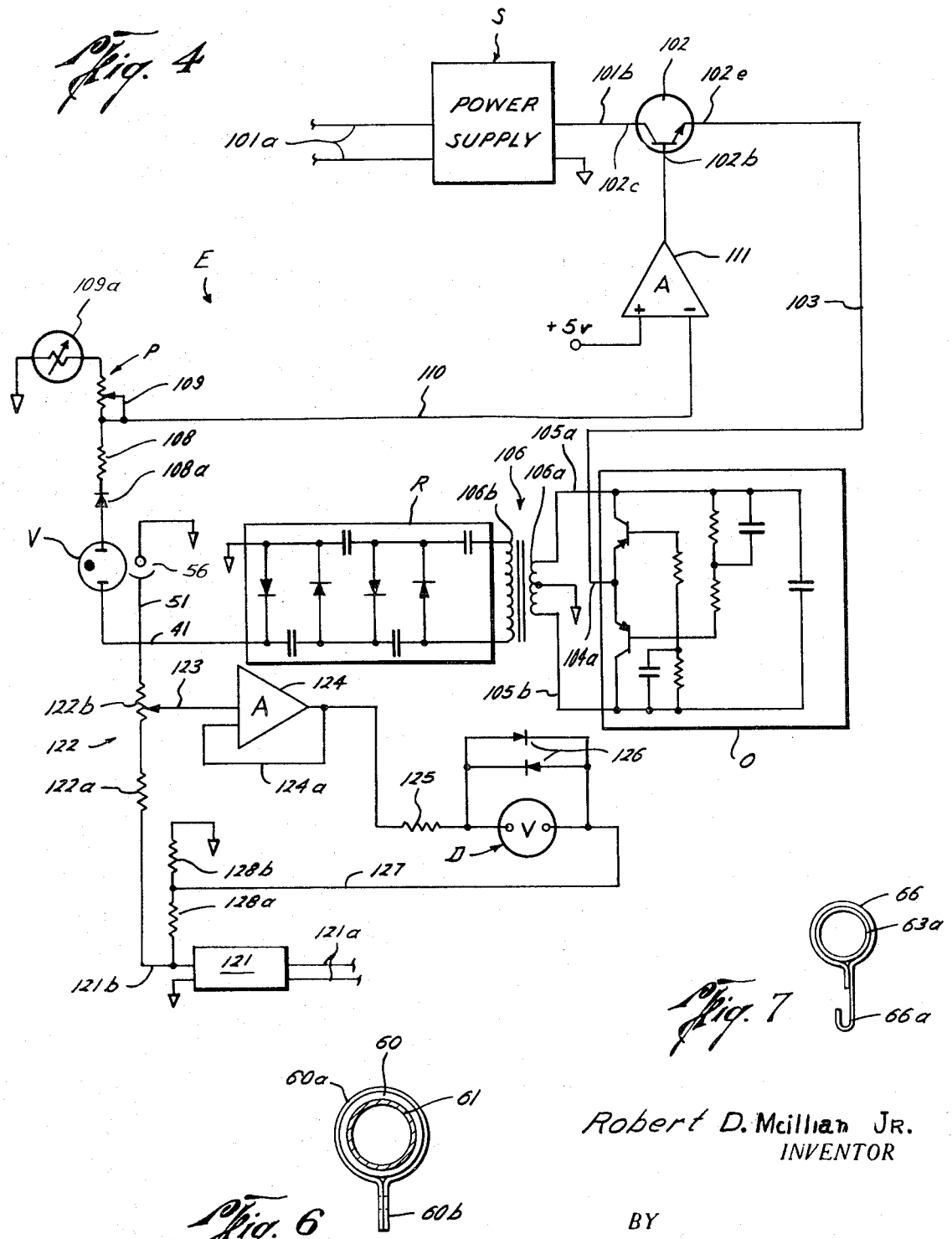

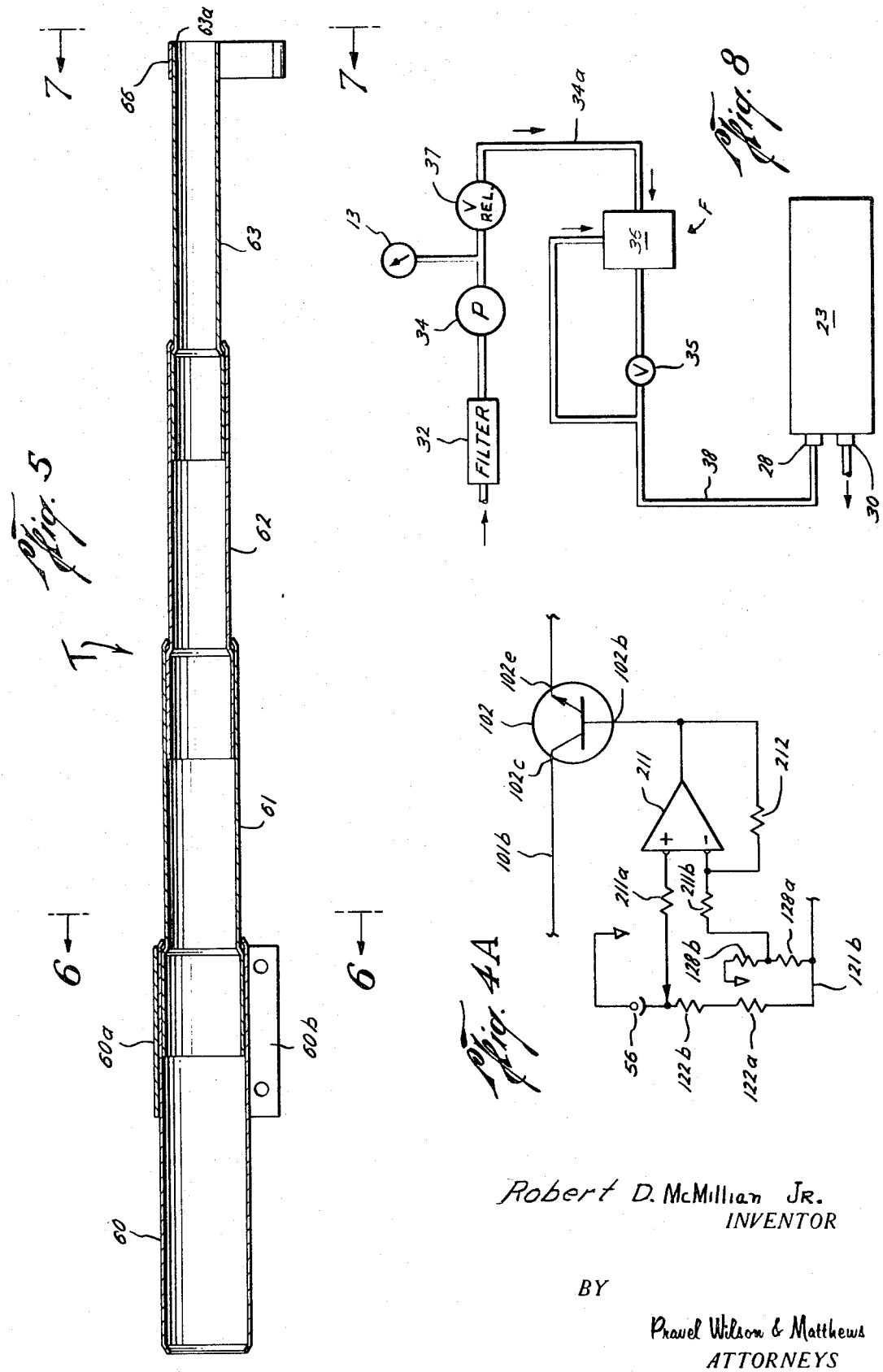

3,752,748
OZONE GENERATING APPARATUS
AND METHOD
Robert D. McMillan, Jr., Houston, Tex., assignor to
McMillan Electronics Corporation, Houston, Tex.
Filed Apr. 19, 1971, Ser. No. 135,158
Int. Cl. B01k 1/00; B01j 1/10
U.S. Cl. 204—157.1 R                  16 Claims

ABSTRACT OF THE DISCLOSURE

An ozone generating apparatus and method providing substantially constant, controlled concentrations of ozonized gas for repeated operating cycles or for sustained lengths of operating time and capable of being quickly and accurately calibrated to insure accuracy of the ozone concentrations generated.

BACKGROUND OF THE INVENTION

(1) Field of the invention

The present invention relates to apparatus for generating controlled concentrations of ozonized gas for testing, calibration, research and like purposes.

(2) Description of the prior art

In the prior art production of trace concentrations of ozonized gas, the minimum output of certain ozone generators was higher than the desired trace concentrations required. Consequently the output of such generators was mixed with larger amounts of gas in a dilution system to obtain the desired lower concentrations. These systems required frequent, time-consuming expensive chemical analytical tests performed by highly trained personnel, such as the method known in the art as the "one-percent neutral buffered potassium iodide" method, in order to accurately monitor and control the output ozone concentration and obtain the desired concentrations.

In other prior art ozone generators, ultraviolet light was passed through a quartz exposure tube to convert oxygen in the tube to ozone. The illumination intensity of the lamps furnishing the ultraviolet light varied during use of these generators, causing the ozone concentration output of the generator to vary and fluctuate, due to factors such as fluctuations in the voltage and current supplied to the lamps, lamp deterioration during the service life, and other factors, requiring the time-consuming and expensive chemical testing previously mentioned. Further, the oxygen passing through the quartz exposure tubes received only a portion of the light from the lamp, reducing the operating efficiency of the generator. Also, the quartz exposure tubes were expensive.

SUMMARY OF THE INVENTION

Briefly, the present invention provides an apparatus and method for generating controlled concentrations of ozone in a flow of gas for testing, analysis and like purposes by irradiating the gas with radiant energy and sensing and controlling the power furnished to the irradiating source in order to control the concentration of ozone formed in the gas. The power furnished to the irradiating source is adjusted in order to control and calibrate the output concentration of ozone in the gas to obtain the desired concentration levels.

The source of the irradiating energy is mounted within a chamber receiving a flow of gas in which the ozone is to be generated in order that the gas may circulate about the source and thereby permit more efficient and accurate operation of the ozone generating apparatus. The concentration of ozone formed in the gas may be selectively varied, if desired, by enclosing a portion of the source within a telescoping tube to control the amount of radiation furnished to the gas by the source.

It is an object of the present invention to provide a new and improved apparatus and method for generating controlled concentrations of ozone.

It is an object of the present invention to provide a new and improved ozone generating apparatus and method which forms rapidly calibrated and controlled concentrations of ozone.

BRIEF DESCRIPTION OF THE DRAWINGS

FIG. 1 is an isometric view of the ozone generating apparatus of the present invention;

FIG. 2 is a side elevation view, taken in section, of the ozone generating apparatus of the present invention;

FIG. 3 is an end elevation view, partly in section, of the ozone generating apparatus of the present invention;

FIG. 4 is a schematic electrical circuit diagram of the apparatus of the present invention;

FIG. 4A is a schematic circuit diagram of an alternative embodiment of a portion of the circuit of FIG. 4;

FIG. 5 is a cross-sectional view of the telescoping tube assembly of the apparatus of FIGS. 2 and 3;

FIG. 6 is a cross-sectional view taken along the lines 6—6 of FIG. 5;

FIG. 7 is a cross-sectional view taken along the lines 7—7 of FIG. 5; and

FIG. 8 is a schematic diagram of the flow of gas through the apparatus of the present invention.

DESCRIPTION OF THE PREFERRED EMBODIMENT

In the drawings, the letter A designates generally the apparatus of the present invention which provides a sustained, repeatable stream of low concentration ozonized gas, such as air, for applications such as calibration of ozone meters used in air pollution monitoring, accelerated weathering tests of materials, research studies of ozone tolerance levels of plants and animals, and the like. The apparatus A photochemically converts oxygen in the flow of gas into ozone, as will be more evident hereinbelow.

The apparatus A is mounted within a cabinet C (FIG. 1) for protection and for ease of handling. A pair of handles 10 are mounted with the cabinet C to permit lifting and movement of the apparatus A. A display panel 11 is formed on the cabinet C and includes a plurality of pushbutton controls 12 to control the operation of the apparatus A. The pushbutton controls 12 include a "power" pushbutton control switch 12a which permits the flow of electrical operating power to the apparatus A, turning the apparatus A on and off. A "lamp" pushbutton control switch 12b closes an electrical control circuit E (FIG. 4), to be set forth hereinbelow, to permit the flow of electrical power to an ultraviolet source lamp V mounted within a chamber 23 of a housing H of the apparatus A. The lamp V irradiates the incoming flow of gas with ultraviolet radiant energy, as will be more evident hereinbelow, to convert a portion of the oxygen in the gas into ozone at a predetermined concentration.

A "calibrate" pushbutton control switch 12c permits the flow of electrical energy to the electrical control and calibration circuit E (FIG. 4) in order to calibrate the output radiation intensity from the ultraviolet lamp V to control the output concentration of ozone formed in the apparatus A.

A pressure gauge 13 mounted with the display panel 11 indicates the pressure of the gas in a gas flow control and pressure regulation system F (FIG. 8) of the present invention which delivers the gas in which a controlled and calibrated concentration of ozone is to be formed.

An indicating dial 15 of a differential voltmeter D (FIG. 4) in the circuit E is mounted with the display panel 11 of the cabinet C to permit monitoring and observation of the calibration of the apparatus A.

A control knob 17 which controls movement of a telescoping tube assembly T (FIGS. 2 and 5) to control the output radiation intensity from the source V is mounted on the display panel 11. A dial turns indicator 17a is mounted with the control dial 17 and indicates the amount of rotational movement of the control dial 17 in order that the movement of the control dial 17 and the tube assembly T may be observed and controlled during the operation of the present invention. A locking lever 17b is mounted with the display panel 11 and when moved downwardly locks the control dial 17 in position and prevents further rotational movement of such control dial in order that the position of the telescoping tube assembly T (FIG. 2) with respect to the source V may be controlled.

A calibration inlet socket 18 is formed in the display panel 11 to permit passage therethrough of a screwdriver or other suitable means for adjusting the resistance value of a potentiometer P (FIG. 4) which controls the power furnished to the ultraviolet source V by a power supply S.

The housing H (FIGS. 2 and 3) includes an end cap 20, a sleeve 21 and an end plug 22 mounted with each other to form a chamber 23 (FIGS. 2 and 8) in which the incoming flow of gas is irradiated by the ultraviolet source V to form ozone therein. An outwardly extending shoulder 20a is formed in the end cap 20 and mounted within a first end 21a of the sleeve 21 (FIG. 2) to mount the sleeve 21 with the end cap 20. An annular groove 20b is formed in the shoulder 20a and receives therein an O-ring 20c or other suitable annular sealing means to seal the mounting between the end cap 20 and the end 21a of the sleeve 21.

A plurality of support spacing rods 24 (FIGS. 2 and 3) mount the end plug 22 with the end cap 20. One of the support rods 24 is mounted in a position concealed by and behind the ultraviolet lamp V in the view illustrated in FIG. 2. A threaded end 24a (FIGS. 2 and 3) is mounted within a threaded socket 20d formed in the end cap 20 to mount the rod 24 with the end cap 20. A second threaded end 24b of the rod 24 extends through an aperture 22a formed in the end plug 22 into a countersunk socket 22b and receives a nut 24c to mount the sleeve 21 and the end cap 20 with the end cap 22. An annular groove 22c formed in the end plug 22 receives an O-ring 22d therein to form a seal between the end plug 22 and a second end 21b of the sleeve 21 (FIG. 2).

An inlet tube or conduit 26 (FIG. 2) is mounted within the chamber 23 to convey the incoming gas into such chamber in order that oxygen in the gas may be photochemically converted to form ozone in the gas. The inlet tube 26 is mounted within a socket 22e formed in the end plug 22 at one end thereof and is mounted in a like manner in a socket (not shown) formed in the end cap 20. The inlet tube 26 communicates through a passage 27 (FIG. 2) formed in the end cap 20 with an inlet plug or connection 28 (FIGS. 2 and 3).

Incoming gas is furnished to the inlet plug 28 by the flow control and pressure regulation system F (FIG. 8) in a manner to be more evident hereinbelow. The incoming gas passes from the inlet plug 28 through the passage 27 and the inlet conduit 26 and enters the chamber 23 through a plurality of ports 26a formed in the inlet conduit 26 adjacent the end plug 22 (FIG. 2). The incoming gas passes from the ports 26a through the chamber 23 to an outlet passage 29 (FIG. 3) formed in the end cap 20 which conveys the gas having trace concentrations of ozone photochemically formed therein through an outlet plug 30 and suitable gas conduits and manifolds for testing, calibration and like purposes.

The flow control and pressure regulation system F (FIG. 8) provides a flow of incoming gas at a substantially constant input rate in order that the concentration of ozone formed in the incoming gas by the apparatus A may be maintained at a substantially constant and repeatable level. The incoming gas is first passed through an air inlet filter and scrubber 32 which may be, for example, a 2 to 5 micron filter preceded by a 13× mesh molecular sieve trap to remove ambient ozone from the incoming stream of gas and also to remove hydrogen sulphide and sulphur dioxide gases which might be contained in the incoming flow of gas. If desired, an activated charcoal filter or other suitable gas purification or impurity removing elements may be used in conjunction with the filter and scrubber 32.

The filtered incoming gas enters a positive displacement pump which increases the pressure of the gas to a level of approximately 7 to 10 p.s.i. The output of the pump 34 is passed through a conduit 34a to an orifice 35. The pressure drop across the orifice 35 is maintained at a substantially constant rate by a differential pressure regulator 36. A suitable pressure regulator might be for example, the Model 59 manufactured by Fairchild-Hiller. The regulator 36 maintains a substantially constant 3 p.s.i. differential pressure across orifice 35. The pressure regulator 36 also maintains a substantially constant flow rate of 5 liters/minute when downstream pressures vary as much as 2 p.s.i. from a nominal zero p.s.i.g. A pressure release valve 37 is connected between the output of the pump 35 and the pressure regulator 36 in order that excess pumped gas from the output of the pump 34 may escape when the pressure output of the pump 34 exceeds the desired regulated air flow pressure across the orifice 35 and pressure regulator 36.

The regulated gas output from the orifice 35 under a substantially constant pressure is conveyed through a conduit 38 to the inlet plug 28 of the apparatus A. The incoming gas passes from the inlet plug 28, as has been set forth hereinabove, through the inlet conduit 26 and the ports 26a into the chamber 23 to be irradiated by the ultraviolet source V in order that oxygen in the incoming gas may be photochemically converted into ozone. The gas passes from the chamber 23 through the outlet passage 29 (FIG. 3) and the outlet plug 30 and outlet tubes to be used for testing, calibration and other suitable purposes.

The outlet plug 30 and the outlet tubing and manifolds associated therewith are preferably fabricated from Teflon or similar material, or of Teflon inner coatings in order to preserve the trace concentrations of ozone formed in the incoming gas by the apparatus A by preventing impurities from reacting with the trace concentrations of ozone in the gas.

The ultraviolet source lamp V (FIGS. 2–4) is a low-pressure, cold cathode, mercury arc lamp providing ultraviolet radiant energy in the ultraviolet spectrum at suitable wavelengths to cause portions of the oxygen in the incoming gas to be photochemically converted into ozone to form trace concentrations of ozone in the incoming gas. A suitable ultraviolet source lamp V, for example, is that manufactured by Ultraviolet Products, Inc. of San Gabriel, Calif. as Model No. PCQ9G-1.

The ultraviolet lamp V receives energizing power in the form of electrical current at a base 40 through an electrical conductor 41. The lamp V is mounted with the housing H by a support 42. The support 42 and a tapered surface 42a thereof are mounted within a socket 20e formed in the end cap 20 of like configuration to the support 42. A spring clip 43 (FIGS. 2 and 3) which is mounted with a face 20f of the end cap 20 by a screw 43a engages the support 42 of the lamp V and holds the lamp V firmly in place within the housing H.

An envelope 45 of the ultraviolet lamp V has mercury therein which forms a mercury arc when the ultraviolet lamp V receives electrical power over the conductor 41.

The mercury arc in the ultraviolet lamp V irradiates the incoming gas in the chamber 23 with ultraviolet radiant energy and forms trace concentrations of ozone therein. An annular sealing gasket 46 is mounted with the shoulder 20a of the end cap 20 (FIG. 2) by brads 46a or other suitable mounting means to seal the chamber 23 adjacent the socket 20e of the end cap 20 and the envelope 45 of the ultraviolet lamp V.

A sensing photodiode assembly B houses a sensing photodiode 56, which may be for example an RCA photodiode, part No. 934. The photodiode 56 is electrically connected at a base 56a (FIG. 2) with the electrical control and calibration circuit E by an electrical conductor 51. The conductor 51 extends through a base 50 of a cylindrical cannister 52 of the photodiode assembly B mounted within the chamber 23. An aperture or window 52a is formed in the canister 52. The window 52a passes ultraviolet light to a sensing surface of the photodiode 56 to sense the output radiation intensity of the ultraviolet lamp V in order that the output intensity of such lamp may be calibrated. The photodiode assembly B is inserted through a cylindrical socket 20g (FIG. 2) formed in the end cap 20. An O-ring 53 is mounted with the photodiode assembly B within the socket 20g in order to seal the socket and prevent leaks or escape of the gas from within the chamber 23.

A snap ring 54 sets the depth that the base 50 of the photodiode assembly B can be inserted into chamber 23 and prevents further lateral movement of the photodiode assembly B with respect to the housing H. An Allen head set screw is inserted through a socket 55 formed in the end cap 20 to engage the photodiode assembly B and prevent rotational or lateral movement of the photodiode B with respect to the housing H. The photodiode assembly B is initially rotated with respect to the housing H, after insertion therein, to position the window 52a of the photodiode assembly B in the proper position relative to the ultraviolet source V to provide a maximum reading of the radiation intensity output of the lamp V for a given power input. The set screw is then inserted in the socket 55 to maintain the photodiode assembly B in the proper position with respect to the housing H.

The radiant energy output of the ultraviolet lamp V passes through the window 52a and is sensed by a sensing element within the photodiode 56, changing the conductivity of the photodiode 56 in accordance with the output radiation intensity of the ultraviolet lamp V, permitting calibration of the apparatus A by the calibration and control circuit E (FIG. 4), as will be more evident hereinbelow.

The telescoping tube assembly T (FIGS. 2, 3 and 5–7) controls the surface area of the ultraviolet lamp V over which the gas in the chamber 23 may flow, and accordingly controls the concentration level of ozone formed in the gas by controlling the surface area of the source V exposed to the gas. The telescoping tube assembly T encloses longitudinal portions of the cylindrical envelope 45 of the lamp V and thus linearly varies the concentration level in accordance with the lengths of the envelope 45 enclosed within the telescoping assembly T.

The telescoping tube assembly T (FIG. 5) includes a plurality of sleeve members 61, 62, and 63, of successively smaller outer diameters, telescopingly mounted with respect to each other and with respect to a housing member 60. An annular collar 60a soldered to the exterior of the housing 60 has a mounting bracket 60b (FIGS. 5 and 6). The mounting bracket 60b is attached with a downwardly extending arm of a mounting bracket 65 (FIG. 1). The mounting bracket 65 is attached with the end plug 22 by a screw or brad 65a. A socket 22f is formed in the interior of the end plug 22 to permit mounting of the housing 60 within the chamber 23 at the desired position.

The sleeve portions 61, 62, and 63 of the telescoping tube assembly T move with respect to each other, to selectively enclose portions of the length of the envelope 45 of the ultraviolet lamp V.

A collar member or sleeve 66 (FIGS. 5 and 7) is mounted at an outer end 63a of the telescoping sleeve member 63. A clasp or hook member 66a is formed with the sleeve 66 and receives therein a cable or pulley cord 68 (FIG. 2) and transmits movement of the cable 68 to the telescoping sleeves 61, 62, and 63 of the telescoping tube assembly T to adjust the amount of surface area of the envelope 45 of the source V exposed to the gas in the chamber 23.

The cable 68 is a continuous or endless loop and passes over a drive pulley 70 (FIGS. 2 and 3) and a driven pulley 71 (FIG. 2). Rotational movement of the drive pulley 70 causes movement of the cable 68 and consequent movement of the telescoping tube assembly due to the connection between the clasp 66a and the cable 68, as has been previously set forth.

The driven pulley 71 is rotatably mounted on an axis 71a in a clevis shaped pulley hanger member 72 within the chamber 23 (FIG. 2). The support arm 24 passes between the downwardly extending arms of the clevis-shaped pulley hanger 72 and a support sleeve 73 (FIG. 2) mounted with the pulley hanger 72. A flange or collar 73a (FIG. 2) formed at an opposite end of the sleeve 73 from the pulley hanger 72 receives the force from a partially or fully compressed spring 74. The spring 74 bears against the shoulder 20a of the end cap 20 and against the flange 73a to exert a force on the sleeve 73 and pulley hanger 72 to maintain the tension in the cable 68 substantially constant. The constant tension in the cable 68 permits accurate movement and control of the position of the telescoping tube assembly T with respect to the ultraviolet source V in order to accurately control the amount of surface area of the ultraviolet lamp V over which the gas in the chamber 23 passes during the operation of the invention.

A shaft 80 connects a turns counting stop 81 and a flexible coupling 81a. An extension 80a of the shaft 80 connects the turns counting stop 81 with the control dial 17 (FIG. 1). The turns counting stop 81 limits the number of rotations of the dial 17 to a predetermined number in order to limit rotational movement of the drive pulley 70 and prevent damage to the clasp 66a which moves the telescoping tube assembly T upon movement of the cable 68. The flexible coupling 81a connects shaft 80 to shaft 82 and permits limited misalignment.

A shaft 82 passes through a rectangular support plate 83 secured by screws 83a to a cylindrical housing 84. The housing 84 is mounted in a cylindrical socket 20h formed in the end cap 20 (FIG. 3) and is provided with a sealing O-ring 84a to prevent escape of the gas from the housing H.

The shaft 82 passes through a sleeve 85 mounted in a cylindrical aperture 84b formed in the housing 84 to a gear reduction drive arrangement G (FIG. 3). An O-ring 84c is mounted with the shaft 82 to seal the passage through the sleeve 85 and aperture 84b.

The gear reduction drive G is mounted in a chamber 86 formed in the housing 84 (FIG. 3) by brads 86a or other suitable fastening means. A drive axle 87 supported by a bushing is mounted in a socket of the gear reduction drive G by a set screw 86b. The drive pulley 70 is mounted with the axle 87 in a chamber 88 formed in the end cap 20. The gear reduction drive G reduces the number of rotations of the axle 87 in response to rotational movement of the shafts 80 and 82 to a lesser number than the rotations of the shafts 80 and 82 in order that accurate and precise control of the movement of the cable 68 and the telescoping tube assembly T may be obtained.

The power supply S (FIG. 4) of the electrical control and calibration circuit E receives alternating current electrical power over input conductors 101a and provides a regulated direct current over an output conductor 101b to a collector 102c of a power transistor 102. The regulated direct current flows from the collector 102c to an emitter 102e of the power transistor 102. The amount of current flow from the collector 102c to the emitter 102e is controlled by the voltage appearing at a base 102b of the transistor 102.

The current from the emitter 102e of the power transistor 102 is conveyed by a conductor 103 to an input terminal 104a of a collector coupled astable multivibrator or oscillator O. The oscillator O receives the regulated direct current over the conductor 103 from the input terminal 104a and converts such regulated current into an output alternating current signal of a suitable frequency, for example 1000 hertz, varying in amplitude in accordance with the input current amplitude at the input terminal 104a, over a pair of output conductors 105a and 105b to a center-tapped primary coil 106a of a voltage step-up transformer 106. A secondary coil 106b of the transformer 106 has a greater number of coils than the primary coil 106a and thus receives a greater induced voltage than the voltage present on the primary coil 106a.

The secondary coil 106b of the voltage step-up transformer 106 furnishes the increased voltage to a voltage-doubling rectifier R. The rectifier R provides a rectified direct current voltage over the conductor 51 to the ultraviolet source V. An alternating current voltage or ripple voltage remains present in the direct current voltage output of the rectifier R furnished to the ultraviolet source V over the conductor 41.

It has been found to be desirable to retain a significant ripple voltage in the output of the rectifier R in order to prevent migration of the mercury in the envelope 45 of the lamp V to one end of the lamp during sustained operation of such lamp. Migration of the mercury would occur if a substantially constant direct current were supplied to the lamp V with no ripple, and would induce a non-linearity in the radiation intensity output of the source V with respect to relative position of the telescoping tube assembly T due to the increased amount of mercury present at one end of the envelope 45. The alternating current ripple present in the output of the rectifier R retards such undesirable puddling or migration.

A ballast resistor 108 and a diode 108a electrically connect the ultraviolet lamp V and the potentiometer P. The potentiometer P senses the power furnished to the ultraviolet source V by receiving the current therefrom. The current flowing through the potentiometer P from the ultraviolet source V and the ballast resistor 108 provides a voltage indicating the power furnished to the ultraviolet source V. A slide arm 109 of the calibration potentiometer P is movable under control of an adjustment means inserted in the socket 18 (FIG. 1) to adjust the resistance of the potentiometer P, increasing or decreasing the impedance of the series electrical circuit of the ultraviolet source V and the potentiometer P, to adjust the current and the electrical power furnished to the ultraviolet source V in order to control and calibrate the concentration of ozone formed in the gas in the chamber 23.

A positive temperature coefficient thermistor 109a is connected between the potentiometer P and electrical ground. The thermistor 109a is mounted in the canister 52 within the chamber 23 and senses the temperature of the chamber 23 and increases its resistance value in response to increasing temperature therein. The thermistor 109a further automatically controls and regulates the power furnished to the source V by compensating for temperature changes or fluctuations in the chamber 23.

The voltage drop across the sensing potentiometer P, indicating the current and power furnished to the ultraviolet source V, is furnished over an electrical conductor 110 to a control amplifier 111.

The control amplifier 111 is an inverting high gain operational amplifier and provides an output signal to the base 102b of the power transistor 102 inversely related to the current flowing to the lamp V. The output signal of the control amplifier 111 is proportional to the difference between a constant voltage bias applied to a positive input terminal 111a and the voltage representing the potential drop in the potentiometer P furnished to a negative input terminal 111b thereof, and is thus inversely proportional to the current flowing to the lamp V. The output signal of the control amplifier 111 is applied to the base 102b of the power transistor 102 and increases the flow of current through transistor 102 from power supply S in response to a decrease of current through the lamp V and potentiometer P, and decreases the current through transistor 102 from the power supply in response to increased current in the lamp V. Amplifier 111 and transistor 102 thus control and regulate the flow of electrical current to the oscillator O, the rectifier R and the ultraviolet source V in order to stabilize, control and regulate the current flow through, and the radiation intensity output of, the ultraviolet lamp V, and control the concentration level of ozone formed in the gas in the chamber 23.

A direct current power supply 121 receives electrical current over input conductors 121a and furnishes such current in the form of biasing direct current through a voltage dividing network 122, including a fixed resistor 122a and a variable resistor 122b, to the sensing photodiode assembly B. The direct current output of the power supply 121 biases the photodiode assembly B in the proper operating region and permits the photodiode assembly B to sense the radiation output intensity of the ultraviolet source V in order that the output intensity of the ultraviolet source V may be calibrated by adjusting the position of the contact 109 of the potentiometer P to regulate the flow of current to the lamp V.

The direct current biasing voltage on the conductor 121b is furnished through the resistors 122a and 122b to an input conductor 123 of an operational amplifier 124. The operational amplifier 124 is operated in the voltage follower configuration by a feedback conductor 124a and senses the potential present on the input conductor 123 and provides an amplified output signal corresponding to the input signal present on the conductor 123. The potential present on the conductor 123 is indicative of the radiation intensity output of the ultraviolet source V, since the resistance value of the sensing photodiode assembly B varies inversely in accordance with the radiation intensity output of the ultraviolet source V and accordingly causes the current flow through the fixed resistance 122a and variable resistance 122b to vary inversely in accordance with the radiation intensity output of the ultraviolet source V.

The amplified output signal of the amplifier 124 indicative of the radiation intensity output of the ultraviolet source V is furnished to the differential millivoltmeter D through a current limiting resistor 125 which protects the voltmeter D in the event that output of the amplifier 124 exceeds the full scale reading capability of the voltmeter D. A plurality of back-to-back diodes 126 are electrically connected in parallel with the voltmeter D to further protect the voltmeter D in the event that the output of the amplifier 124 exceeds the full scale reading of the voltmeter D. The voltmeter D is electrically connected by a conductor 127 to a voltage dividing network including a fixed resistance 128a and a fixed resistance 128b. The variable resistance 122b is initially adjusted by moving the contact thereof which furnishes the voltage over the conductor 123 to the operational amplifier 124 until the differential voltmeter D indicates a null reading, by causing the voltage present in the variable resistance network 122 at conductor 123 to equal the voltage present in the fixed voltage dividing network 128 at conductor 127. In this manner, subsequent changes in the voltage indications of the voltmeter D are due to changes in the conductivity of the sensing photodiode assembly B caused by changes in the radiation output intensity of the ultraviolet source V, indicating that changes in the resistance value of the calibration potentiometer P are necessary in order to adjust the power furnished to the ultraviolet source V to maintain a constant output intensity thereof.

In an alternative arrangement for sensing the power furnished to the ultraviolet source V (FIG. 4A) like circuit components to those of FIG. 4 performing like functions bear like reference numerals. Sensing photodiode 56 is electrically connected to the potentiometer 122b and fixed resistance 122a and receives ultraviolet energy from the ultraviolet lamp V.

The conductor 123 electrically connects the tap of the variable resistance 122b through an input resistance 211a to a positive input terminal of a control amplifier 211, which is a high gain, differential input operational amplifier. The conductor 127 electrically connects a negative input terminal of the amplifier 211 through an input resistance 211b to the connection between the fixed resistances 128a and 128b.

A feedback resistance 212 electrically connects the output of the amplifier 211 to the negative input terminal of the amplifier 211 to control and regulate the gain of the amplifier 211. The output terminal of the amplifier 211 is electrically connected to the base 102b of the transistors 102 to control the current flowing from the power supply S over the conductor 101b through the collector 102c and the emitter 102e of the transistor 102 and the conductor 103 to the oscillator O.

The sensing photodiode 56 senses the power of the ultraviolet source V by sensing the radiation output intensity of the source V and adjusting its resistance value in inverse relation thereto, as has been previously set forth. Increases in the radiation output intensity of the source V decrease the resistance of the photodiode 56, reducing the voltage furnished to the positive input terminal of the control amplifier 211. The reduced voltage input to the amplifier 211 reduces the output of the amplifier 211 furnished to the transistor 102 and decreases the current passing through the transistor 102 to the oscillator O, thereby regulating the power furnished to the source V in order to automatically control the output radiation intensity thereof and to control and regulate the concentration of ozone formed in the gas in the chamber 23.

In a like manner, the photodiode 56 senses decreases in the radiation output intensity of the source V, increasing the voltage furnished to the control amplifier 211 and increasing the output of the amplifier 211 to permit increased current to flow through the transistor 102 to the oscillator O to increase the power furnished to the source V.

When the photodiode 56 is used to sense the radiation output intensity of the source V and automatically control the input voltage to the control amplifier 211 to regulate current furnished to the ultraviolet source V, as set forth hereinabove, the photodiode 56 is mounted in the chamber 23 adjacent the annular sealing gasket 46. The photodiode 56 may thus receive ultraviolet radiant energy from the source V during partial enclosure of the source V by the telescoping tube assembly T in order to control the power furnished to the source V. The length of the telescoping tube assembly T would be shortened to prevent complete enclosure of the source V by same and thereby prevent loss of automatic regulation and control of the current through transistor 102 by the photodiode 56.

In the operation of the present invention, the gas containing oxygen in which trace concentrations of ozones are to be formed is furnished to the chamber 23 by the flow control and pressure regulation system F (FIG. 8) in controlled and regulated flow rates and pressures and passes over the envelope 45 of the ultraviolet lamp V. With the ultraviolet lamp V mounted within the chamber 23 for receiving the flow of gas, the flow of gas circulates about the ultraviolet source V while being irradiated, permitting a more efficient and accurate operation of the ultraviolet source, by insuring that the flow of gas is circulated with respect to the ultraviolet source V and receives ultraviolet energy therefrom.

Electrical energy is furnished to the power supply S and from the power supply S through the oscillator O and rectifier R to the ultraviolet source V. Initially, no current flows through the source V and the potentiometer P. No voltage is present at the input 111b of the amplifier 111, causing the output voltage of the amplifier 111 to reach its maximum value, and driving the transistor 102 into saturation.

The oscillator O receives the very large input from the saturated transistor 102 and produces an output square wave voltage proportional to the input voltage on the terminal 104a, providing a maximum output voltage from the oscillator O to the voltage-doubling rectifier circuit R in order to provide a voltage to the ultraviolet source V sufficiently high to cause ignition of the ultraviolet source V.

The ultraviolet source V receives current upon ignition, which current flows through the potentiometer P and causes a voltage drop across the potentiometer P. The voltage drop across the potentiometer P is furnished to the input terminal 111b of the amplifier 111. The input potential at the terminal 111b decreases the output of the amplifier 111 and reduces the output of the amplifier 111 to a value sufficiently low to drive the transistor 102 out of saturation by lowering the voltage present at the base 102b of such transistor.

After the ultraviolet source V is ignited by the flow of current the control amplifier 111 regulates the flow of current through the transistor 102 and conductor 103 to the oscillator O in response to the current flowing through the ultraviolet lamp V in order to maintain a substantially constant current flow through the ultraviolet source and regulate the power furnished to the ultraviolet source in order to control the range of concentration levels of ozone formed in the gas.

The range of trace concentration levels of ozone formed in the gas in chamber 23 is established in accordance with the electrical power in the form of regulated current furnished to the lamp V by the circuit E when the current is established by setting the potentiometer P.

When it is desired to adjust the trace concentration level of ozone being formed in the gas in the chamber 23 within the limits of the radiation output intensity of the ultraviolet source V for the established current flowing therethrough, the amount of exposed surface of the source V is adjusted by moving the knob 17 on the display panel 11, causing the telescoping tube assembly T to move with respect to the envelope 45 and selectively enclose varying portions of the length of the enevelope 45 of the ultraviolet source V. The extent of the enclosure of the ultraviolet source V may be increased or decreased in accordance with the desired increase or decrease in the trace concentration of ozone formed in the gas. Indicator 17c gives a display indicating the extent of enclosure of the ultraviolet source V by the telescoping tube assembly T and allows control and regulation of the desired trace concentration within the radiation intensity limits established and controlled by the electrical control and calibration system E (FIG. 4).

During extended use of the ultraviolet source V, the radiation output intensity decreases for a fixed amount of electrical current furnished to such source due to the extended use. In order to re-calibrate the output intensity of the ultraviolet source V to achieve the desired radiation intensity limits to maintain constant trace concentration levels of ozone in the gas in the chamber 23, the dial 17 is rotated until the telescoping tube assembly T is substantially fully retracted with respect to the envelope 45 of the lamp V. The retraction of the tube assembly T permits ultraviolet light to pass from the lamp V through the window 52 of the photodiode B and control the impedence value of such photodiode and adjust the current flowing in the variable resistance 122. The change in the current in the variable resistance 122 is furnished to the amplifier 124 and causes an indication of the change in the radiation output intensity in the form of a voltage reading of the differential voltmeter D indicated by the meter face 15 on the display panel 11. The resistance value of the potentiometer P is then adjusted by movement of the calibration socket 18 on the display panel 11 and arm 109 to change the resistance value of the potentiometer until the current through the ultraviolet lamp V reaches sufficient intensity to cause the photodiode B to change the voltage reading on the differential voltmeter D to the desired zero level. When the differential voltmeter D again indicates a zero voltage difference, due to the increased current in the ultraviolet lamp V re-calibrating the output intensity of the ultraviolet lamp V to the desired radiation output intensity, the telescoping tube assembly T is then moved to cover the photodiode window 52a of photodiode assembly B. Covering the window 52a through which the photodiode 56 receives radiation energy from the source V at times when the apparatus A is not being calibrated increases the service life of the photodiode 56.

The calibration of the ultraviolet lamp V in the manner previously set forth affords substantial reduction in the time, cost and complexity of re-calibrating the ozone generating apparatus A of the present invention when contrasted to the prior art chemical calibration tests. Further, varied trace concentrations may be selectively achieved by adjusting the extent of enclosure of the source V by the telescoping tube assembly T. The varying concentrations may be repeatedly obtained by monitoring the extent of enclosure by observing the dial indicator 17c on the display panel and noting the relative position of the tube assembly T with respect to the source V when the desired trace level is obtained. In the event it becomes subsequently necessary to repeat the formation of such a trace concentration level, the dial 15 is adjusted to move the telescoping tube assembly T with respect to the lamp V and adjust the position to again selectively enclose the desired portion of the ultraviolet lamp V to achieve the desired repeated trace concentration level.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

What is claimed is:

1. An apparatus for generating controlled concentrations of ozone in a flow of gas for testing, analysis and like purposes, comprising:
   (a) source means for irradiating the gas to form ozone therein;
   (b) supply means furnishing power for energizing said source means;
   (c) means for sensing the power furnished to said source means; and
   (d) control means responsive to said sensing means for regulating the power furnished to said source means stream of ozonized gas of a desired concentration wherein the concentration of ozone formed in the gas is controlled to form a susetained, repeatable stream of ozonized gas of a desired concentration level.

2. The structure of claim 1, further including:
   calibration means for adjusting the power furnished to said source means wherein the radiation output of said source means is regulated to control and calibrate the concentration of ozone in the gas.

3. The structure of claim 2, further including:
   meter means for indicating the radiation output of said source means wherein the power furnished to said source means may be adjusted by said calibration means.

4. The structure of claim 1, further including:
   (a) chamber means for receiving the flow of gas to be irradiated by said source means; and
   (b) means for mounting said source means within said chamber means wherein the flow of gas circulates about said source means while being irradiated, permitting efficient and accurate operation of said source means.

5. The structuure of claim 1, further including:
   (a) telescoping tube means for selectively enclosing said source means to control the surface area of said source means exposed to the gas; and
   (b) means for moving said telescoping tube means with respect to said source means to adjust the exposed surface area of said source means, wherein the concentration of ozone in the gas may be selectively varied.

6. The structure of claim 5, further including:
   means for indicating the extent of enclosure of said source means by said telescoping tube means.

7. The structure of claim 1, wherein said means for sensing comprises:
   means for sensing the radiation output intensity of said source means.

8. The structure of claim 1, wherein:
   (a) said source means comprises ultraviolet lamp means for irradiating the flow of gas with ultraviolet light;
   (b) said supply means comprises means for furnishing electrical power to said lamp means;
   (c) said sensing means comprises means for sensing the electrical current flowing in said lamp means; and
   (d) said control means comprises current-sensitive means for controlling the power furnished to said lamp means in response to the current flowing in said lamp means.

9. An ozone generating apparatus providing rapidly calibrated and controlled concentrations of ozone in a gas, comprising:
   (a) source means for irradiating the gas to form ozone therein;
   (b) supply means furnishing power to energize said source means;
   (c) means for sensing the radiation output intensity of said said source means; and
   (d) calibration means for adjusting the power furnished to said source means in accordance with the radiation intensity output of said source means wherein the radiation output of said source means is regulated to form a sustained, repeatable stream of ozonized gas of a desired concentration level.

10. The structure of claim 9, further including:
   meter means for indicating the radiation output of said source means wherein the power furnished to said source means may be adjusted by said calibration means.

11. The structure of claim 9, wherein said calibration means comprises:
   control means responsive to said means for sensing, said control means controlling the power furnished to said source means.

12. The structure of claim 9, wherein said calibration means comprises:
   potentiometer means for controlling the power furnished to said source means by said supply means.

13. The structure of claim 9, wherein:
   (a) said source means comprises ultraviolet lamp means for irradiating the flow of gas with ultraviolet light;
   (b) said supply means comprises means for furnishing electrical power to said ultraviolet lamp means; and
   (c) said calibration means comprises potentiometer means for controlling the electrical power furnished to said source means by said supply means.

14. A method of generating controlled concentrations of ozone in a flow of gas for testing, analysis and like purposes, comprising the steps of:
(a) irradiating the gas to form ozone therein;
(b) furnishing power required for said step of irradiating;
(c) sensing the power furnished; and
(d) regulating the power furnished in response to said step of sensing, wherein the concentration of ozone is controlled to form a sustained, repeatable stream of ozonized gas of a desired concentration level.

15. The method of claim 14 further including the step of:
adjusting the power furnished for said step of irradiating to control and calibrate the concentration of ozone in the gas.

16. The method of claim 14, further including the step of:
varying the amount of radiation furnished during said step of irradiating to achieve the desired concentration of ozone.

References Cited

UNITED STATES PATENTS

| | | | |
|---|---|---|---|
| 2,857,323 | 10/1958 | Cromwell | 204—176 |
| 3,198,726 | 8/1965 | Trikilis | 204—320 |
| 3,455,803 | 7/1969 | Miller | 204—176 |
| 3,576,733 | 4/1971 | Beitzel | 204—176 |

FOREIGN PATENTS 907,104  10/1962  Great Britain _____ 204—316

HOWARD S. WILLIAMS, Primary Examiner

U.S. Cl. X.R.

204—193, 176, 320, 316